United States Patent
Varga et al.

(10) Patent No.: US 6,734,872 B1
(45) Date of Patent: May 11, 2004

(54) SYSTEM, METHOD, AND PROGRAM FOR OPTIMALLY CACHING OVERLAY INSTANCES IN A MEMORY SYSTEM

(75) Inventors: John Thomas Varga, Longmont, CO (US); Rose Ellen Visoski, Louisville, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,667

(22) Filed: May 15, 2000

(51) Int. Cl.$^7$ .................................................. G09G 5/00
(52) U.S. Cl. ....................... 345/629; 345/557; 358/1.17
(58) Field of Search ................................. 345/501, 530, 345/557, 629, 536–538; 358/1.1, 1.17, 1.16

(56) References Cited

U.S. PATENT DOCUMENTS

| | | |
|---|---|---|
| 5,307,449 A | 4/1994 | Kelley et al. |
| 5,542,031 A | 7/1996 | Douglass et al. |
| 5,727,220 A | 3/1998 | Hohensee et al. |
| 5,786,826 A | 7/1998 | Kwok |
| 5,790,714 A | 8/1998 | McNeil et al. |
| 5,864,342 A | 1/1999 | Kajiya et al. |
| 6,348,975 B1 * | 2/2002 | Tsunekawa et al. ........ 358/1.17 |
| 6,466,226 B1 * | 10/2002 | Watson et al. .............. 345/629 |

* cited by examiner

Primary Examiner—Kee M. Tung
(74) Attorney, Agent, or Firm—Scott W. Reid; Bracewell & Patterson, LLP

(57) ABSTRACT

A system, method, and program for optimally caching in a memory system an overlay instance. The system includes a local memory and a rasterizing processor coupled to the local memory. Responsive to receipt of a presentation requirement specifying an overlay stored in a memory device, the rasterizing processor determines whether an overlay instance for the overlay is cached in a memory system. Responsive to the overlay instance not being cached in the memory system, the rasterizing processor generates a new overlay instance for the overlay and caches the new overlay instance in the memory system. Responsive to the overlay instance being cached in the memory system, the rasterizing processor produces another overlay instance tailored to the presentation requirements, compares the another overlay instance to the cached overlay instance and then caches into the memory system only one overlay instance among the another overlay instance and the cached overlay instance that best presents the overlay. The rasterizing processor discards the other overlay instance.

21 Claims, 10 Drawing Sheets

SYSTEM, METHOD, AND PROGRAM FOR OPTIMALLY CACHING OVERLAY INSTANCES IN A MEMORY SYSTEM

BACKGROUND OF THE INVENTION

1. Technical Field

The present invention relates in general to document presentation, and, in particular, to caching rasterized data used in document presentation.

2. Description of the Related Art

A document is generally a data collection created by an application program, such as a word processing application, that is logically subdivided into pages. A page comprises objects, such as text, images, graphical objects, and display elements, that are to be displayed on one side of a sheet, subject to various formatting specifications, such as size, margins, font, color, depth, etc. When printed, document pages are presented on sheets, which are presentation units generally having at least two sides (e.g., a front side and a back side). Each side of a sheet may contain one or more pages.

A document is generally a piece of work created by a computer application program, such as a word processing document created by a word processing application. The work for a document typically comprises one or more sheets. A sheet is a presentational unit within the document in which each sheet has at least two sides (e.g., a front side and a back side). An exemplary sheet is a sheet of paper having a front side of the paper and a back side of the paper among various sheets of paper in a paper stack. A sheet may contain one or more pages. A page comprises objects, such as text, images, graphical objects, and display elements, that are displayed on one side of a sheet, subject to various formatting specifications, such as size, margins, font, color, depth, etc. A page may also include one or more overlays.

An overlay is a pre-defined page or part of a page that a host processor of a print server loads and sends to a local memory system of a printer. An overlay may include text, images, graphics, bar codes, and/or other objects. Overlays are stored in a memory system until they are deactivated. In contrast, if pages are stored, the pages are saved in the local memory system only until they are printed. Overlays are typically used to present fixed data on a document that does not move with respect to the sheets.

An overlay may be included in a page by specifying in the data for the page a command to include the overlay (e.g., an "include overlay" command). A rasterizer for the printer receives the data for the page and responds to the "include overlay" command by retrieving the stored overlay from the local memory system. The rasterizer processes and rasterizes the overlay, creating rasterized data specifying the usage of the overlay. An "overlay instance" is the data specifying a particular usage of the overlay.

The overlay instance is typically cached into a memory system for future use. However, a particular cached overlay instance can only be used again if the same overlay is placed at the same location and same side of a sheet. If the overlay is to be presented at a different location or side of a sheet, then the rasterizer must re-rasterize the overlay to create a new overlay instance, and the new overlay instance is then cached into the memory system. Thus, several overlay instances for the same overlay end up being cached into the memory system when the data stream specifies that the overlay be placed at different locations and/or on various sides of sheets. Furthermore, in a conventional parallel rasterizer which has a master processor and several satellite processors coupled to the master processor, each satellite processor has to save and maintain its own overlay instances for the same overlay.

The creation and storage of various overlay instances for the same overlay results in the inefficient use of the rasterizer and memory space. Therefore, the present invention recognizes that the conventional method of caching overlay instances for an overlay in a memory system needs to be improved. In addition, it would be desirable to reduce or eliminate redundant processing of overlay data by the rasterizer.

SUMMARY OF THE INVENTION

A system, method, and program for optimally caching in a memory system an overlay instance. The system includes a local memory and a rasterizing processor coupled to the local memory. Responsive to receipt of a presentation requirement specifying an overlay stored in a memory device, the rasterizing processor determines whether an overlay instance for the overlay is cached in a memory system. Responsive to the overlay instance not being cached in the memory system, the rasterizing processor generates a new overlay instance for the overlay and caches the new overlay instance in the memory system. Responsive to the overlay instance being cached in the memory system, the rasterizing processor produces another overlay instance tailored to the presentation requirements, compares the another overlay instance to the cached overlay instance and then caches into the memory system only one overlay instance among the another overlay instance and the cached overlay instance that best presents the overlay. The rasterizing processor discards the other overlay instance.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF ILLUSTRATIVE EMBODIMENT

Figure 1:
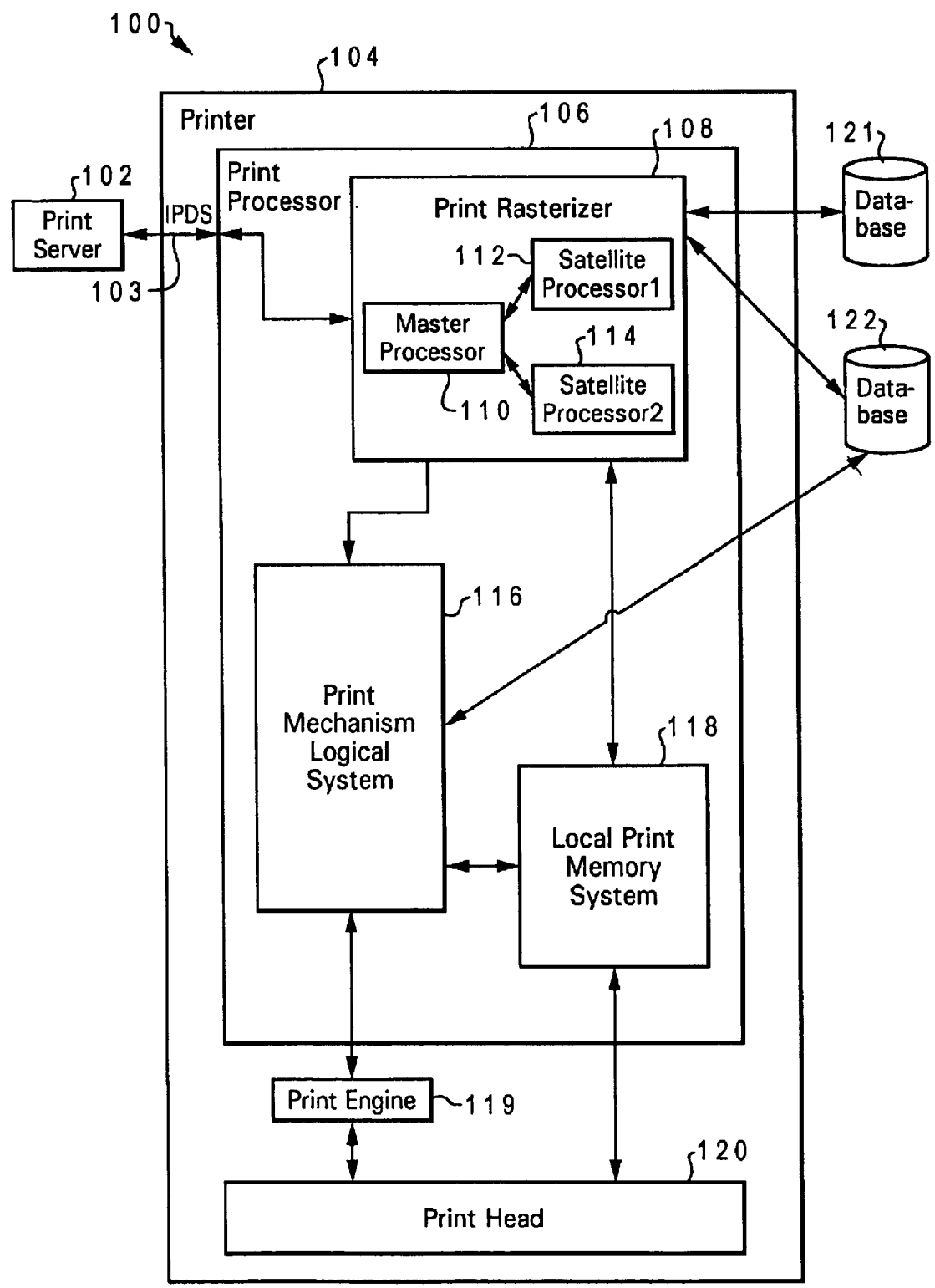
FIG. 1 is an exemplary block diagram of a printer that caches in a memory system an overlay instance of an overlay and prints the overlay in accordance with the present invention.

With reference now to FIG. 1, an exemplary block diagram of a printing system 100 that caches in a memory system an overlay instance of an overlay and prints the overlay in accordance with the present invention is shown. Printing system 100 includes a printer 104 and a print server 102 that manages the printing of documents by printer 104. Print server 102 has or receives a data stream. An exemplary data stream may employ the Mixed Object Document Content Architecture (MO:DCA) developed by International Business Machines ("IBM") Corporation of Armonk, N.Y.

In response to receipt of a print file (e.g., a MO:DCA print file) within the data stream (e.g., MO:DCA data stream), print server 102 translates the print file into an appropriate presentation data stream (e.g., IPDS 103). IPDS is disclosed in detail in *Data Stream and Object Architectures: Intelligent Printer Data Stream (IPDS) Reference,* Copyright IBM Corp. 1987, 1993, which is hereafter referred to as the IPDS specification and is incorporated by reference herein. IPDS 103 is received at printer 104 by print processor 106, which comprises a print rasterizer 108 (also known as a raster image processor ("RIP")) that renders each page of document data within IPDS 103 into a presentation-ready format (e.g., bit-mapped format). Print rasterizer 108 may be a single rasterizer or a parallel rasterizer. Print rasterizer 108 is preferably a parallel rasterizer having a master processor 110 coupled to at least a first satellite processor 112 and a second satellite processor 114. Satellite processors 112 and 114 are capable of processing pages of data from IPDS 103 in parallel, thus providing efficient rasterization of IPDS 103.

Print processor 106 further includes a print mechanism logical system 116 and a local print memory system 118. Print processor 106 is in communication with a print head 120, which prints a rasterized or bit-mapped version of the data in IPDS 103. Coupled to print processor 106 is a database 121, which stores the overlay which print server 102 directed to be stored. Also coupled to print processor 106 is a database 122, which stores overlay instances cached by print processor 106.

Print mechanism logical system 116 is coupled to database 122 to receive document data therefrom. If printer 104 prints in a print on-demand ("POD") mode, then a side builder logical system for building sides of pages is made part of print mechanism logical system 116. Print mechanism logical system 116 is also coupled to communicate with a local print memory system 118. A print engine 119 is coupled to print mechanism logical system 116, and print head 120 is coupled in communication with local print memory system 118 and print mechanism logical system 116. Print engine 119 comprises the components of printer 104 that generate a printed image based on control signals provided by print processor 106. Print mechanism logical system 116 interprets the sheet specification from print rasterizer 108 and sends control signals to print head 120 via print engine 119. Print head 120 is the part of printer 104 that actually controls the mechanical imprinting of characters on sheets of paper.

Figure 2:
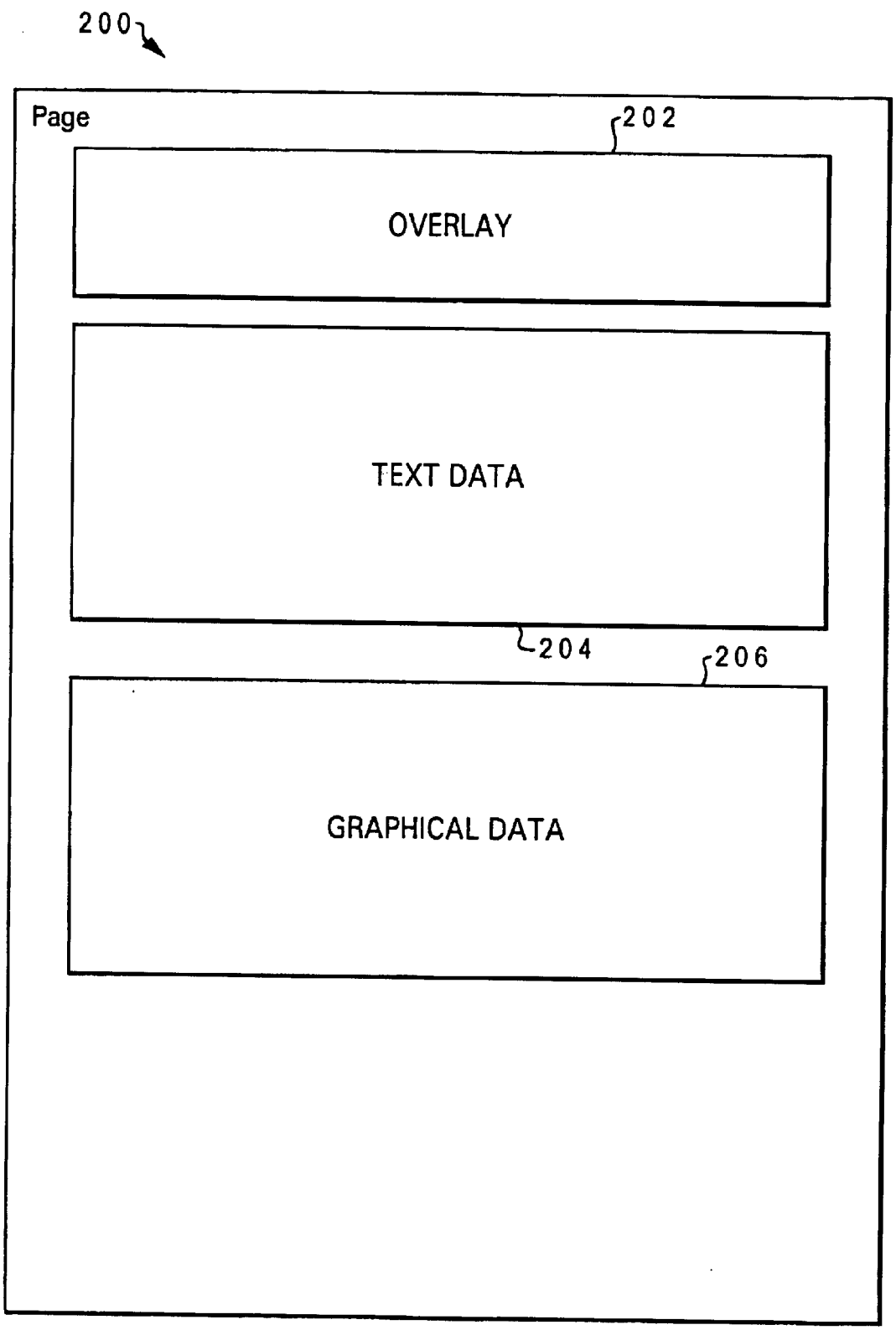
FIG. 2 is a page having an exemplary overlay, textual data, and graphical data.

Referring now to FIG. 2, a page 200 having an exemplary overlay 202, textual data 204, and graphical data 206 is shown. An overlay, such as overlay 202, is defined as a type of resource that is stored in a printer (e.g., printer 104) for later usage. Overlay 202 is a pre-defined page that a host processor of print server 102 loads and sends to database 121 of printer 104 via print rasterizer 108. Overlay 202 may include text, images, graphics, bar codes, and/or other objects. Overlay 202 is stored in database 121 until it is deactivated. Overlay 202 is typically used to present fixed data on a document that does not move with respect to the sheets.

Overlay 202 may be included in a page by specifying in the data for the page a command to include overlay 202 (e.g., an "include overlay" command). Exemplary overlays include headers or footers of a document, logos, letterheads, or electronic forms within a document. Print rasterizer 108 receives the data for the page and responds to the "include overlay" command by retrieving overlay 202 from database 121. Print rasterizer 108 processes and rasterizes overlay 202, creating rasterized data specifying the usage of the overlay. An "overlay instance" is the data specifying a particular usage of the overlay.

The format of an overlay contains at least an overlay identification, dependencies, and a list of overlay instances. The overlay identification is a number assigned by print rasterizer 108 for associating an overlay instance cached in the printer storage (e.g., database 122) to the particular overlay. Dependencies are various items on which the overlay depend for its specification. Dependencies of an overlay may include various fonts, page segments (e.g., portions of page or overlay that print rasterizer 108 loads and sends to the printer storage), and other overlays. If the dependencies change in any way, then various cached overlay instances for the overlay are invalidated and must be re-built by print rasterizer 108.

An overlay instance specifies a particular instance of usage of the overlay. The overlay instance includes the horizontal size of the overlay ("x-size"), the vertical size ("y-size") of the overlay, the horizontal-positional offset ("y-offset") of the overlay typically from the left side of the sheet, and the vertical-positional offset ("y-offset") of the overlay typically from the top of the sheet. The offsets are determined based on the origin being the top, left corner of the page. Positive offsets represented by a plus sign ("+") in front of an offset value signifies overlay 202 being positioned a distance to the right from the side of the page for the horizontal offset or a distance down from the top of the page for the vertical offset. Negative offsets represented by a minus sign ("−") in front of an offset value signifies overlay 202 being positioned a distance to the left from the side of the page for the horizontal offset or a distance up from the top of the page for the vertical offset.

The overlay instance also specifies the dependencies, a reference count for tracking the number of rasterizing processors currently using the overlay instance, a sequential number assigned for identifying the overlay instance, and a "least-recently-used" value for determining which cached versions of the overlay have been least recently used and are therefore to be deleted from the printer storage when the printer storage is full. The overlay instance also has an instance key for identifying further specifics of the overlay instance. The instance key includes the overlay identification, a particular rotational position of the overlay which may be, for example, 0 degrees, 90 degrees, 180 degrees, or 270 degrees, a resolution (e.g., 240 dots-per-inch ("dpi"), 600 dpi, etc.), and error handling controls, which may be IPDS error recovery settings that are used by print rasterizer 108 when an error occurs in creating the instance. The overlay instance in accordance with the present invention also maintains a current minimal logical size of the overlay derived from intersecting various overlay instances, as described below.

Figure 3:
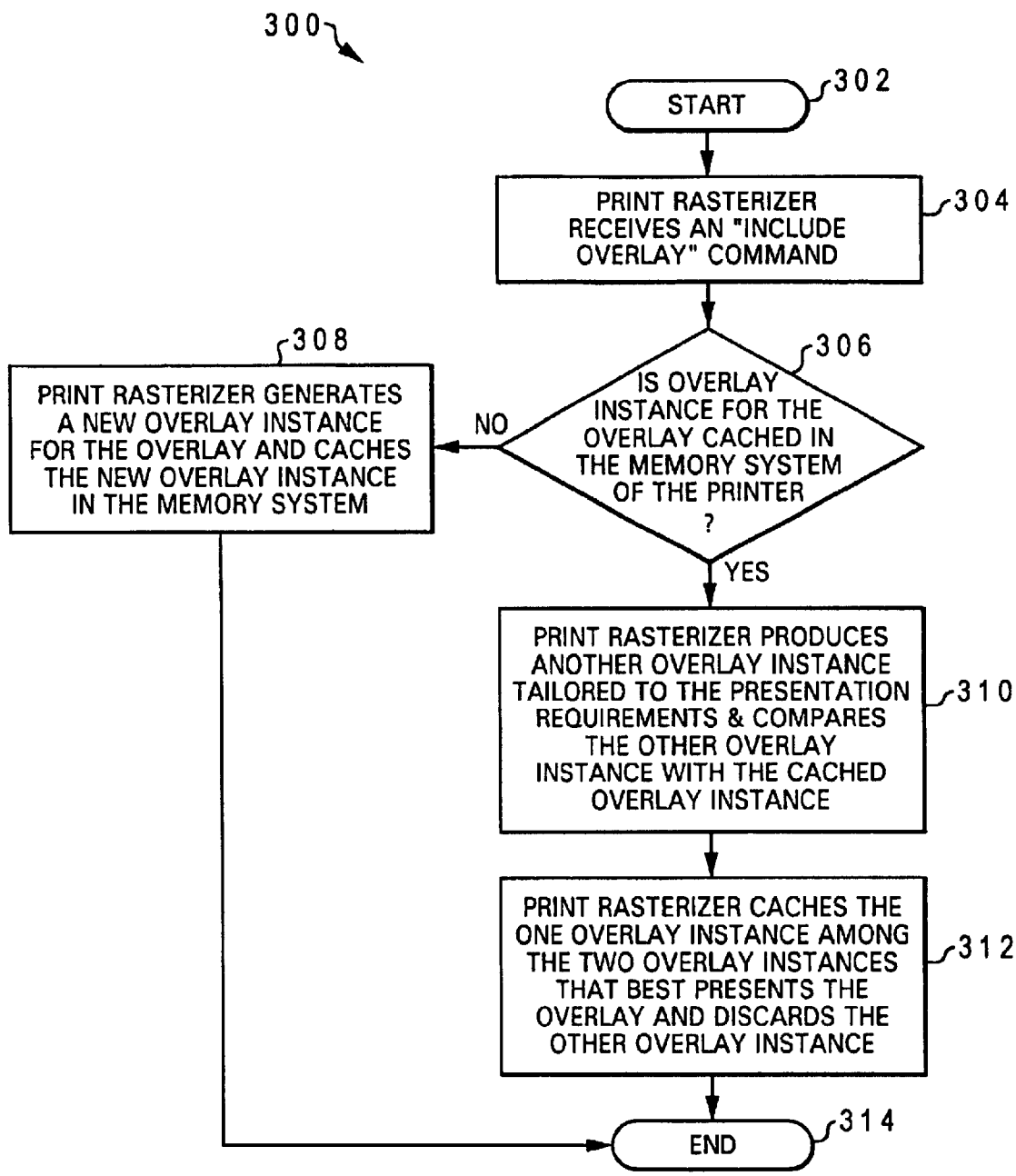
FIG. 3 is a flow chart of an exemplary method and program function for caching in a memory system an overlay instance of an overlay in accordance with the present invention.

With reference now to FIG. 3, a flow chart of an exemplary method 300 and program function for caching in a printer storage (e.g., database 122) an overlay instance in accordance with the present invention is shown. Method 300 starts at block 302 and moves to block 304, which depicts print rasterizer 108 receiving an "include overlay" command in data received from print server 102. Method 300 next proceeds to decision block 306, which shows print rasterizer 108 determining whether an overlay instance for the overlay has been cached in a memory system (e.g., database 122) of printer 104.

If at decision block 306 an overlay instance for the overlay has not been cached into database 122, then method 300 moves from decision block 306 to block 308. Block 308 shows print rasterizer 108 generating a new overlay instance for the overlay and caching the new overlay instance in database 122. Method 300 then ends at block 314. However, if at decision block 306 an overlay instance for the overlay has been cached in database 122, then method 300 moves from decision block 306 to block 310. Block 310 depicts print rasterizer 108 producing another overlay instance tailored to the presentation requirements provided by the "include overlay" command and/or the data of the page from print server 102. Print rasterizer 108 compares this other overlay instance with the cached overlay instance. Following block 310, block 312 shows print rasterizer 108 caching the one overlay instance among the two overlay instances that best presents the overlay and discarding the other overlay instance. The determination may be based upon which overlay instance provides the smaller display area and/or occupies a smaller amount of memory when stored. Method 300 thereafter ends at block 314.

Figure 4:
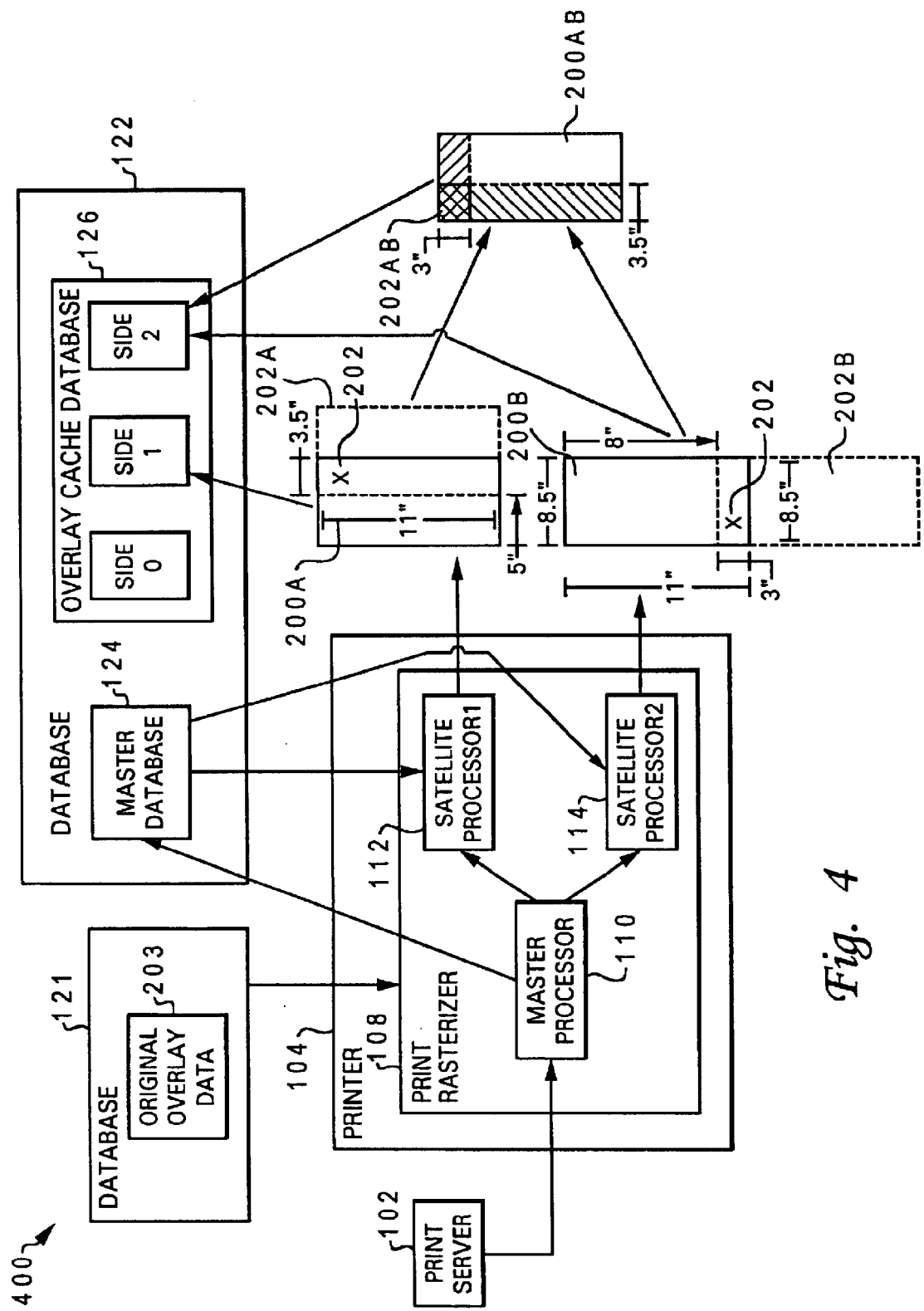
FIG. 4 is a process flow diagram for illustrating the principles of the present invention.

FIGS. 4 through 8 illustrate an exemplary implementation of the present invention. FIG. 4 is a process flow diagram 400 that illustrates the principles of the present invention. Diagram 400 includes print server 102, printer 104, print rasterizer 108 with master processor 110 and satellite processors 112 and 114, and databases 121 and 122, which were shown in FIG. 1. Database 122 contains both a master database 124 and an overlay cache database 126. Master database 124 is memory space dedicated to master processor 110. A host processor of print server 102 directs original overlay data 203 for overlay 202 to be stored in database 121. Print rasterizer 108 is coupled and has access to database 121. Overlay 202 contains the letter "X".

Figure 8:
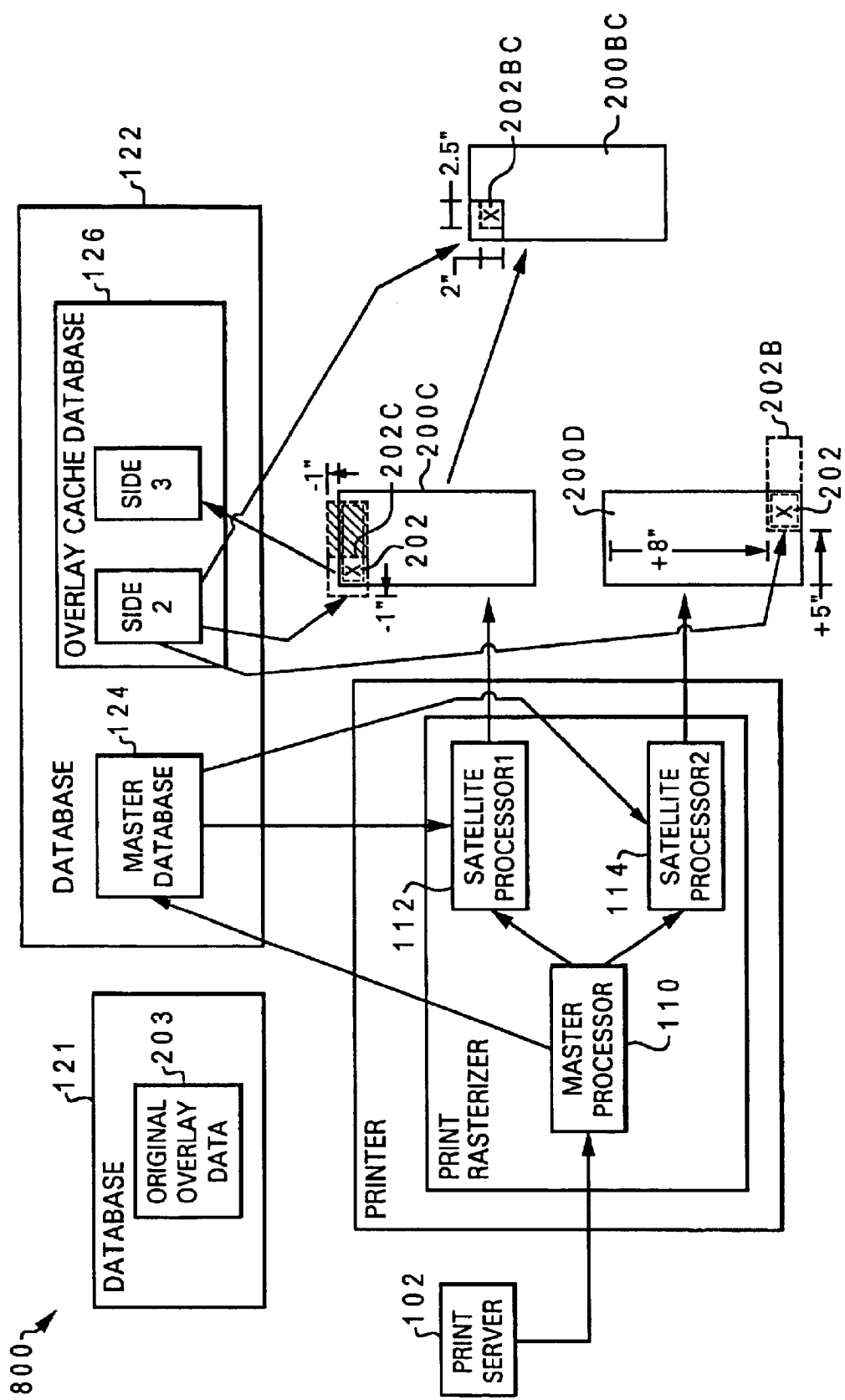
FIG. 8 is another process flow diagram for illustrating the principles of the present invention.

The exemplary implementation in FIGS. 4 and 8 illustrate overlay instances of overlay 202 on a page that is 8.5" wide by 11" high (e.g., either page 200A or 200B in FIG. 4, or page 200C or 200D in FIG. 8). When overlay data 203 for overlay 202 is initially rasterized and used for the first time (e.g., first overlay instance), the first overlay instance specifies overlay 202 having a horizontal size of 8.5", a vertical size of 11", 0" horizontal offset, 0" vertical offset, an overlay identification, and a rotation of 0 degrees. First overlay instance is cached into overlay cache database 126 as data for "side 0".

FIG. 4 further shows that first satellite processor 112 processes second overlay instance 202A of overlay 202. Second overlay instance 202A specifies overlay 202 having a horizontal offset of +5" (e.g., 5" to the right from the side of page 200A). If first satellite processor 112 generates no error during the processing of second overlay instance 202A, then second overlay instance 202A at least specifies the following: horizontal size=3.5", vertical size=11", horizontal offset=+5", vertical offset=0", overlay identification, rotation=0 degrees, area of overlay=38.5 square inches. Second overlay instance 202A is saved as "Side 1" data in overlay cache database 126. Horizontal size is updated from 8.5", which was derived from the first overlay instance, to 3.5" since print rasterizer 108 knows that overlay 202 still fits on the page even after being offset by 5" from the right of the side of page 200A.

FIG. 4 also shows that second satellite processor 114 processes third overlay instance 202B of overlay 202.

Third overlay instance 202B positions overlay 202 eight inches (8") below the top of page 200B. If second satellite processor 114 generates no errors during the processing of third overlay instance 202B, then third overlay instance 202B at least specifies the following: horizontal size=8.5", vertical size=3", horizontal offset=0", vertical offset=+8", overlay identification, rotation=0 degrees, area of overlay= 25.5 square inches. Vertical size is updated from 11", which was derived from the first overlay instance, to 3" since print rasterizer 108 knows that overlay 202 still fits on the page even after being offset by 8" below the top of page 200A. Third overlay instance 202B is saved as "Side 2" data in overlay cached database 126.

The overlay areas for second and third overlay instances 202A and 202B are then compared to determine which overlay instance will be maintained and which one discarded. Since third overlay instance 202B provides a smaller area than second overlay instance 202A (e.g., 25.5 square inches versus 38.5 square inches), third overlay instance 202B is maintained as the cached version that best presents the data. Data for side 2 is maintained in overlay cache database 126 and data for side 1 is discarded. Also, data for side 0 is discarded since first overlay instance provides an even a larger area of 93.5 square inches.

In FIG. 4, a current minimal logical size is determined from the second and third overlay instances 202A and 202B. Page 200AB shows an appropriately positioned intersection of the second and third overlay instances 202A and 202B. Intersecting overlay instance 200AB has dimensions of 3.5" wide and 3" high is shown, and these dimensions are recorded as the current minimal logical size of overlay 202 with the overlay instance that best presents overlay 202 (e.g., third overlay instance 202B) among the other overlay instances and that is cached and maintained in database 122. The minimal logical size is useful in determining whether the overlay instance, if again later used in other instances, will fall off the page when presented.

Figure 5:
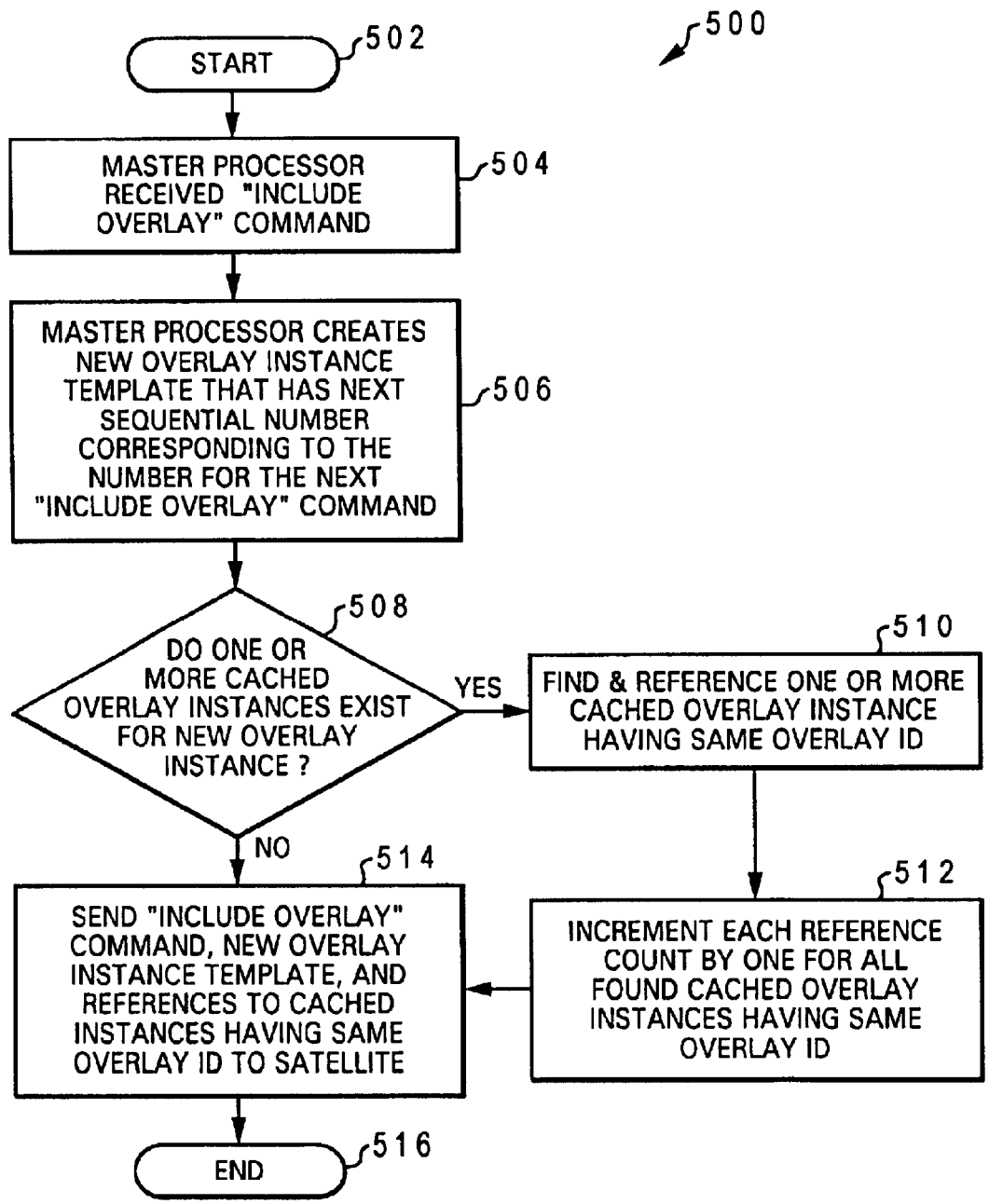
FIG. 5 is a flow chart of an exemplary method and program function for processing an overlay by a master processor of a parallel rasterizer in accordance with the present invention.
Figure 6A:
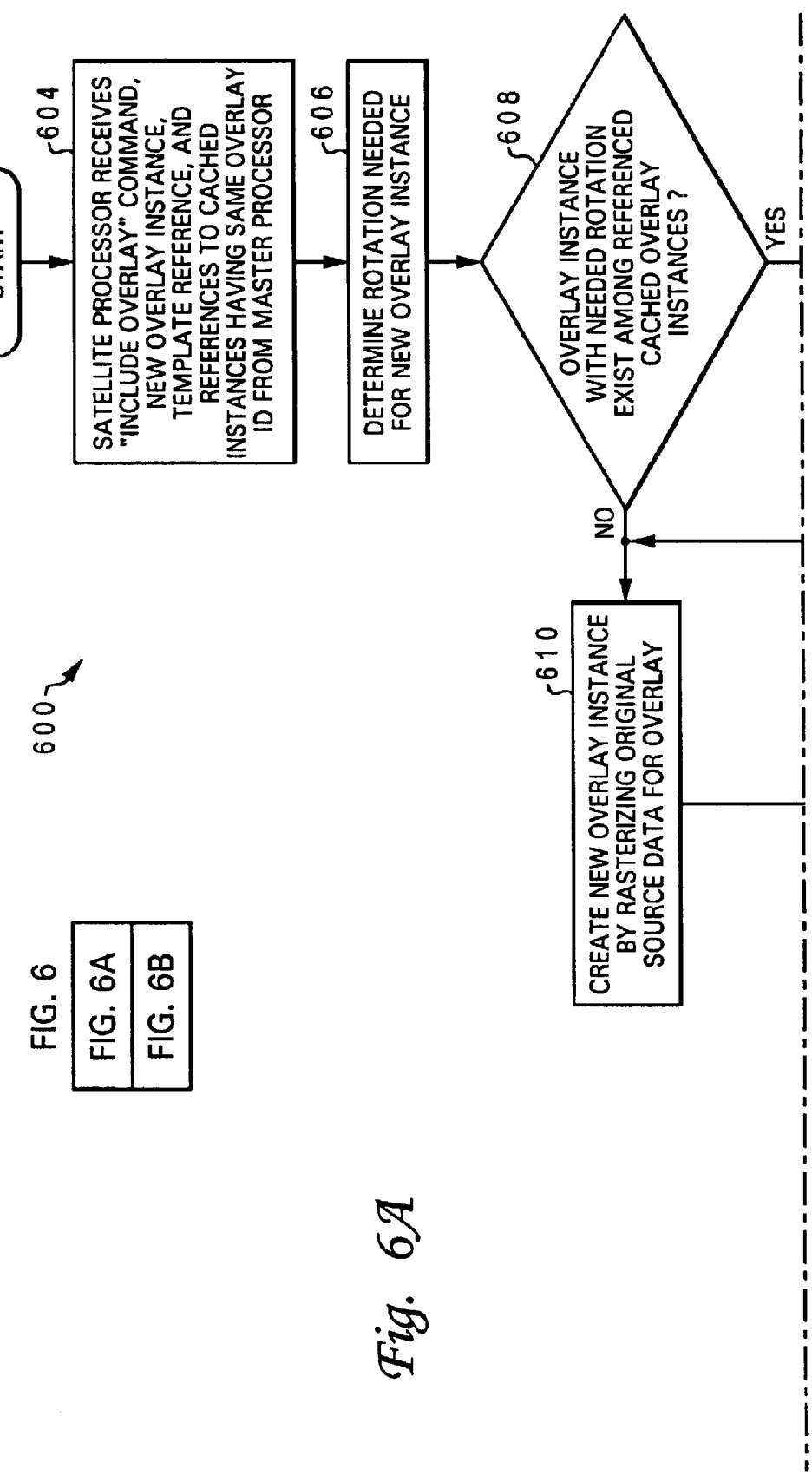
FIG. 6 is a flow chart of an exemplary method and program function for processing an overlay by a satellite processor of a parallel rasterizer in accordance with the present invention.
Figure 6B:
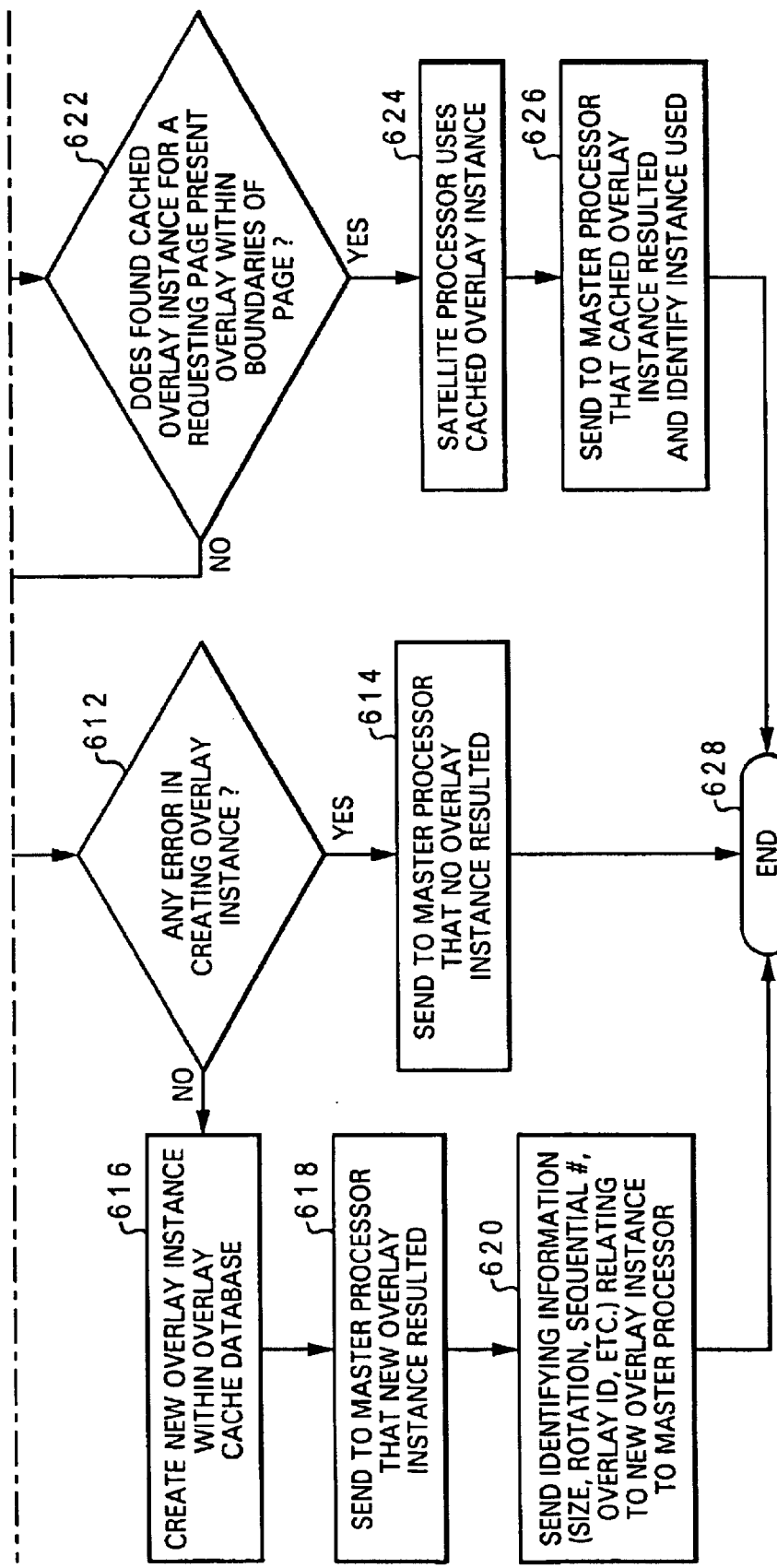

With reference now to FIGS. 5, 6, and 7, exemplary methods 500, 600, and 700 for processing overlay 202 by master processor 110 and satellite processors 112 and 114 of print rasterizer 108 are shown. Methods 500, 600, and 700 are discussed in conjunction with the exemplary processing scenario shown in FIG. 4 in which print rasterizer 108 has already processed first overlay instance for side 0 and is currently processing second and third overlay instances 202A and 202B for sides 1 and 2.

Referring to FIG. 5, method 500 is a method and program function executed by master processor 110. Method 500 starts at block 502 and proceeds to block 504, which depicts master processor 110 receiving an "include overlay" command within IPDS 103. In the exemplary implementation shown in FIG. 4, master processor 110 receives a first "include overlay" command specifying placement of overlay 202 five inches (5") to the right from side of page 200A. Master processor 110 receives a second "include overlay" command specifying placement of overlay 202 eight inches (8") below the top of page 200B. Following block 504, block 506 shows master processor 110 creating a new overlay instance template for each "include overlay" command received. The overlay instance template is a data form used to start the creation of a new overlay instance. The overlay instance template is retained if a new overlay instance is created; otherwise, the overlay instance template is discarded. The overlay instance template may be stored in master database 124. A next new overlay instance template is assigned each time a next "include overlay" command is received by master processor 110. New overlay instance templates are sequentially numbered in the same order as the number of next "include overlay" commands are received by master processor 110. For example, the first "include overlay" command received causes master processor 110 to create and assign a first new overlay instance template for first overlay instance. The second "include overlay" command received causes master processor 110 to create and assign a second new overlay instance template for second overlay instance 202A (e.g., overlay instance with +5" horizontal offset). The third "include overlay" command received causes master processor 110 to create and assign a third overlay instance template for third overlay instance 202B (e.g., overlay instance with +8" vertical offset).

Method 500 next moves from block 506 to decision block 508, which shows master processor 110 determining whether any overlay instance for overlay 202 is cached in database 126 based on checking the overlay identification in each overlay instance in overlay cache database 126. If at decision block 508 one or more cached overlay instances do exist in overlay cache database 126, then method 500 moves from decision block 508 to block 510. Block 510 shows master processor 110 finding and referencing in overlay cache database 126 the one or more cached instances having the same overlay identification as overlay 202. In the exemplary implementation, master processor 110 finds and references first overlay instance for presenting overlay 202 on side 0, which has no offsets. Following block 510, block 512 shows master processor 110 incrementing each reference count for all found cached instances. As stated earlier, the reference count tracks the number of processors using and/or referencing the particular overlay instance. In the example, master processor 110 increments the reference count for first overlay instance. Method 500 then proceeds from block 512 to block 514.

On the other hand, if at decision block 508 a determination is made that no cached overlay instance reside in overlay cache database 126, then method 500 moves directly from decision block 508 to block 514. Block 514 represents master processor 110 sending each "include overlay" command, each new overlay instance template, and the references, if any, of found cached instances having the same overlay identification for each overlay instance to a satellite processor, such as satellite processor 112 or 114. In the exemplary implementation of FIG. 4, first "include overlay" command, a first overlay instance template, and reference to the found first overlay instance are sent to satellite processor 112 while second "include overlay" command, second overlay instance template, and reference to found first overlay instance are sent to satellite processor 114. Method 500 finally ends at block 516.

With reference now to FIG. 6, method 600 is a method and program function executed by satellite processors 112 and 114. Method 600 starts at block 602 and moves to block 604, which depicts satellite processor 112 or 114 receiving an "include overlay" command, a reference to the new overlay instance template stored in master database 124, and the references, if any, of cached overlay instances found in overlay cache database 126 having the same overlay identification from master processor 110. In the exemplary implementation of FIG. 4, first satellite processor 112 receives the first "include overlay" command, a reference to a first overlay instance template stored in master database 124, and a reference to the first overlay instance found in overlay cache database 126 from master processor 110 while second satellite processor 114 receives second "include overlay" command, a reference to a second overlay instance template stored in master database 124, and a reference to first overlay instance found in overlay cache database 126 from master processor 110. Following block 604, block 606 depicts each satellite processor determining the rotation needed for each new overlay instance to be created. In the exemplary implementation, both first satellite processor 112 and second satellite processor 114 determine that a rotation of 0 degrees is needed.

Method 600 next proceeds from block 606 to decision block 608, which shows the satellite processor determining whether an overlay instance with the needed rotation exists among the referenced cached overlay instances in overlay cache database 126. For the exemplary implementation, first satellite processor 112 and second satellite processor 114 both determine whether an overlay instance with a rotation of zero degrees exists among the referenced cached overlay instances. If at decision block 608 the satellite processor determines that an overlay instance with the needed rotation does not exist among the referenced cached overlay instances, then method 600 moves from decision block 608 to block 610.

Block 610 shows print rasterizer 108 creating a new overlay instance by rasterizing original source data 203 for overlay 202 in database 121. Following block 610, decision block 612 depicts the satellite processor determining whether any error occurred in creating the new overlay instance. If at decision block 612 a determination is made that an error occurred in creating the new overlay instance, then method 600 proceeds from decision block 612 to block 614. Block 614 shows the satellite processor sending an indication to master processor 110 that no overlay instance had resulted. Method 600 then proceeds from block 614 and ends at block 628. On the other hand, if at decision block 612 no error occurs in the creation of the new overlay instance, then method 600 proceeds from decision block 612 to block 616.

Block 616 represents the satellite processor caching the new overlay instance within overlay cache database 126 of database 122. In the exemplary implementation, new overlay instances 202A and 202B for sides 1 and 2 are cached into overlay cache database 126. Following block 616, block 618 shows the satellite processor (e.g., first satellite processor 112 and second satellite processor 114) sending to master processor 110 that new overlay instance (e.g., new overlay instances 202A and 202B) had resulted. Method 600 next moves from block 618 to block 620, which depicts the satellite processor sending identifying data (e.g., size, rotation, sequential number, overlay identification, etc.) relating to the new overlay instance to master processor 110. Method 600 ends at block 628.

However, if at decision block 608 the satellite processor determines that an overlay instance with the needed rotation has already been cached, then method 600 next proceeds from decision block 608 to decision block 622. For example, first satellite processor 112 determines that the first overlay instance for side 0 has the needed rotation of zero degrees for second overlay instance 202A, and second satellite processor 112 determines that the first overlay instance for side 0 has the needed rotation of zero degrees for third overlay instance 202B.

Decision block 622 shows the satellite processor determining whether the use of the found cached overlay instance for a next page requesting to include the overlay presents overlay 202 within the boundaries of the requesting page. If at decision block 622 use of cached overlay instance results in overlay 202 falling outside the boundaries of the page, then method 600 proceeds from decision block 622 to block 610 to create and rasterize a new overlay instance, and method 600 continues therefrom. The minimal logical overlay size which is maintained for a cached overlay instance is used to determine whether an overlay 202 presented on a page falls inside or outside the boundaries of the page. In the exemplary implementation, when first overlay instance, which is 8.5"×11" in dimension, is used in a page requesting a second overlay instance 202A, then overlay 202 presented by first overlay instance used in second overlay instance 202A falls outside the boundaries of the requesting page.

However, if at decision block 622 a determination is made that cached overlay instance results in overlay 202 falling inside the boundaries of the page, then method 600 proceeds from decision block 622 to block 624. Block 624 shows the satellite processor using the cached overlay instance found in overlay cache database 126. Following block 624, block 626 depicts the satellite processor sending to master processor 110 that the cached overlay instance resulted along with the reference to the specific instance that was used. Method 600 finally ends at block 628.

Figure 7A:
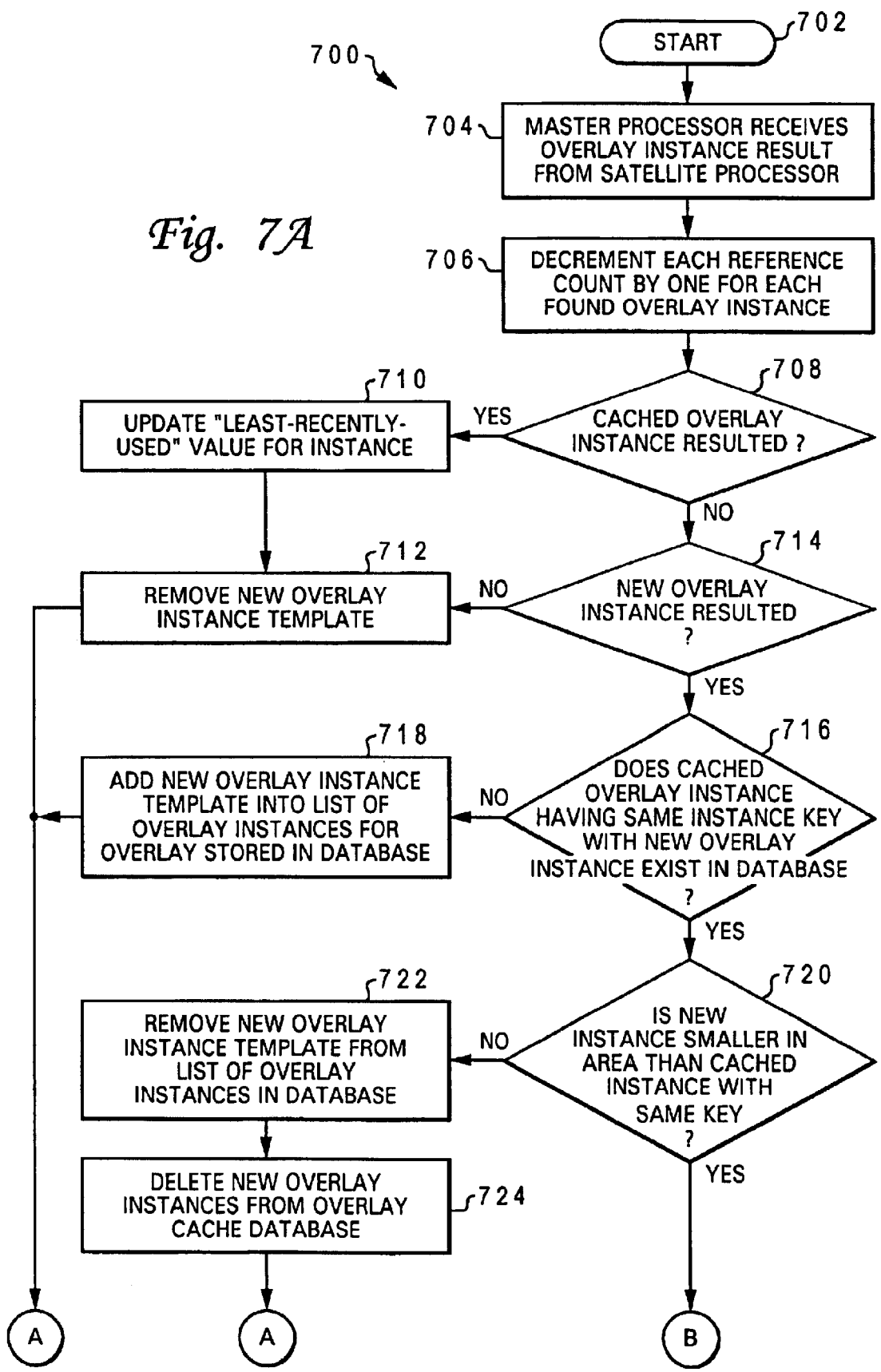
FIGS. 7A and 7B are a flow chart of an exemplary method and program function for further processing the overlay by a master processor of a parallel rasterizer in accordance with the present invention.
Figure 7B:
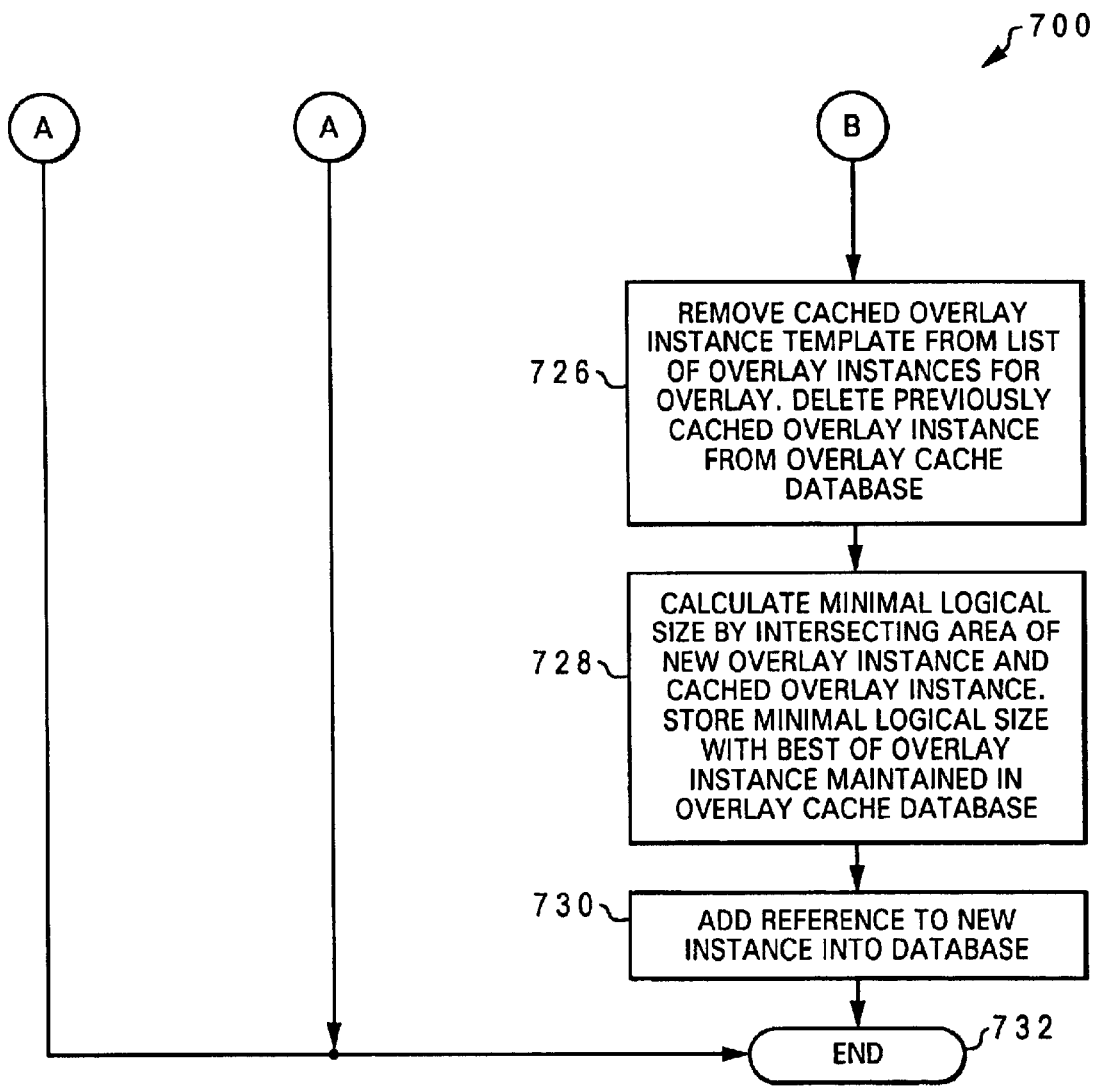

Referring now to FIGS. 7A and 7B, method 700 is a further method and program function executed by master processor 110 after results from satellite processor 112 or 114 are received. Method 700 starts at block 702 and next proceeds to block 704, which shows master processor 110 receiving the results for the overlay instances from satellite processors 112 and 114. Following block 704, block 706 depicts master processor 110 decrementing the reference count for each referenced overlay instance in overlay cache database 126. Referring back to method 500 in FIG. 5, each reference count for all found cached overlay instances having the same overlay identification were incremented to track use and/or reference of each overlay instance by a rasterizing processor (e.g., satellite processor 112 or 114). Since satellite processor 112 or 114 has now finished using or referencing the cached overlay instances that were earlier tracked in method 500, then the reference count for each cached overlay instance is decremented by one. When the reference count for an overlay instance reaches zero, then master processor 110 knows that all rasterizing processors (e.g., satellite processors) are finished using and/or referencing this cached overlay instance and this cached overlay instance can be deleted from overlay cache database 126.

Method 700 then proceeds from block 706 to decision block 708, which depicts master processor 110 determining whether a cached overlay instance resulted from satellite processor 112 or 114. If at decision block 708 a determination is made that a cached overlay instance resulted from satellite processor 112 or 114, then method 700 moves from decision block 708 to block 710. Block 710 depicts master processor 110 updating the "least-recently-used" value for the cached instance as being "recently used" to ensure that frequently referenced instances are not discarded from overlay cache database 126. Following block 710, block 712 shows master processor 110 removing the new overlay instance template that was not used since a cached overlay instance resulted instead of creation of a new overlay instance. Method 700 then moves from block 712 to end at block 732 as shown via connector A. However, if at decision block 708 a determination is made that a cached overlay instance in overlay cache database 126 did not result from satellite processor 112 or 114, then method 700 next moves to decision block 714, which illustrates master processor 110 determining whether a new overlay instance resulted from satellite processor 112 or 114. If at decision block 714 a determination is made that a new instance was not created, then method 700 moves from decision block 714 to block 712, which shows master processor 110 removing the new overlay instance template. Method 700 then ends at block 732 as shown via connector A. On the other hand, if at decision block 714 a determination is made that a new instance was created, then method 700 next proceeds from decision block 714 to decision block 716.

Decision block 716 depicts master processor 110 determining whether a cached overlay instance having the same instance key (e.g., same overlay identification and rotation) as the new overlay instance exists in overlay cache database 126. If a determination is made at decision block 716 that such a cached instance does not exist, then method 700 moves from decision block 716 to block 718, which represents master processor 110 adding the new overlay instance template to the list of overlay instances for overlay 202 stored in database 121. Thereafter, method 700 then ends at block 732 as shown via connector A. However, if a determination is made at decision block 716 that a cached overlay instance having a matching instance key resides in overlay cache database 126, then method 700 proceeds from decision block 716 to decision block 720. Decision block 720 illustrates master processor 110 determining whether the new overlay instance provides an overlay smaller in area than the cached overlay instance with the same instance key.

If at decision block 720 a determination is made that the new overlay instance does not have a smaller area than the cached overlay instance, then method 700 proceeds from decision block 720 to block 722, which depicts master processor 110 removing the new overlay instance template from a list of overlay instances for overlay 202 stored in database 121. Following block 722, block 724 shows master processor 110 deleting new overlay instance from overlay cache database 126. Method 700 then ends at block 732 via connector A. However, if at decision block 720 a determination is made that the new overlay instance has a smaller area than the cached overlay instance, then method 700 proceeds from decision block 720 to block 726 as shown via connector B. Block 726 shows master processor 110 removing the cached overlay instance template from the list of overlay instances from use and deleting the cached overlay instance from overlay cache database 126.

Following block 726, block 728 shows that the master processor 110 calculates the minimal logical size of the area by intersecting the new overlay instance and the cached overlay instance. The minimal logical size is at least stored in overlay cache database 126 with the overlay instance that best presents overlay 202. Method 700 next proceeds from block 728 to block 730, which shows the reference to new overlay instance is added into overlay cache database 126. Method 700 finally ends at block 732.

For the exemplary processing scenario depicted in FIG. 4, first satellite processor 112 finishes processing overlay 202 for page 200A before second satellite processor 114 finishes processing overlay 202 for page 200B. Second overlay instance 202A is therefore cached into overlay cache database 126 while third overlay instance 202B is the new overlay instance. Since the new overlay instance (e.g., third overlay instance 202B has an area of 25.5 square inches) has a smaller area than the cached overlay instance (e.g., second overlay instance 202A, which has an area of 38.5" square inches), then third overlay instance 202B (the new overlay instance) is cached into overlay cache database 126 while the previously cached overlay instance (second overlay instance 202A) is deleted from overlay cache database 126. The minimal logical size for overlay 202 is derived by intersecting second (cached) and third (new) overlay instances 202A and 202B, which is overlay instance 202AB on page 200AB of FIG. 4. The minimal logical size has the dimensions of 3.5" by 3" and is saved in association with third overlay instance 202B in overlay cache database 126 and/or in master database 124.

FIG. 8 is a process flow diagram 800 that illustrates a processing scenarios in which the methods of FIGS. 5, 6, and 7 are repeated for additional overlay instances. Third overlay instance 202B for side 2 is maintained in overlay cache database 126 since third overlay instance 202B more efficiently and better presents overlay 202 than second overlay instance 202A. After third overlay instance 202B has been cached into overlay cache database 126, first satellite processor 112 proceeds to process a fourth instance 202C of overlay 202. Fourth overlay instance 202C at least specifies the following: horizontal size=8.5", vertical size=3", horizontal offset=−1", vertical offset=−1", overlay identification, rotation=0 degrees, area of overlay=25.5 square inches, "currently-known minimal size", 3.5" by 3". Fourth overlay instance 202C is saved as "Side 3" data in overlay cache database 126. Intersecting overlay instance 202BC on page 20OBC is formed by intersecting overlay instance 202C with overlay instance 202B. Intersecting overlay instance 202BC is used to derive the new minimal logical size of overlay 202, which is then updated to 2.5" by 2" and stored with the overlay instance that best presents overlay 202. FIG. 8 also shows that second satellite processor 114 does not need to process a fifth instance because provided third overlay instance 202B will fit into the desired position on the page.

Excess white space presented by third overlay instance 202B may be easily removed. Master processor 110 will now reference overlay instance 202C instead of overlay instance 202B for any new reference using overlay 202 since overlay instance 202C provides the better presentation. FIG. 8 illustrates that the methods of FIGS. 5, 6, and 7 to continue updating the overlay instance that best presents overlay 202.

The present invention discloses a method, system, and program for optimally caching overlay instances for an overlay in a memory system. The present method, system, and program reduces the amount of various overlay instances that are created and maintained for the same overlay. The present method, system, and program results in more efficient use of the rasterizer and memory space. The present invention improves the conventional method of caching overlay instances for an overlay in a memory system and reduces or eliminates redundant processing of overlay data by the rasterizer.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that the present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for caching in a memory system an overlay instance, said method comprising:

in response to receiving a presentation requirements specifying an overlay stored in a memory device, determining whether an overlay instance for the overlay is cached in a memory system;

in response to the overlay instance not being cached in the memory system, generating a new overlay instance for the overlay and caching the new overlay instance in the memory system; and in response to the overlay instance being cached in the memory system, producing another overlay instance tailored to the presentation requirements and comparing the another overlay instance to the cached overlay instance and then caching into the memory system only one overlay instance among the another overlay instance and the cached overlay instance that best presents the overlay and discarding the other overlay instance.

2. The method according to claim 1, wherein determining whether an overlay instance for the overlay is cached in a memory system further comprises:

finding all cached overlay instances of the overlay in the memory system; and determining whether the cached overlay instance exists among the found cached overlay instances in the memory system.

3. The method according to claim 2, wherein comparing the another overlay instance to the cached overlay instance and then caching into the memory system only one overlay instance among the another overlay instance and the cached overlay instance that best presents the overlay further comprise:

selecting the cached overlay instance as the one instance if the cached overlay instance has a smaller overlay area than the another overlay instance; and selecting the another overlay instance as the one instance if the another overly instance has the smaller overlay area than the cached overlay instance.

4. The method according to claim 2, wherein finding all cached overlay instances of the overlay in the memory system and determining whether the cached overlay instance exists among the found cached overlay instances in the memory system further comprise:

referencing all cached overlay instances for the overlay in the memory system;

determining a rotation of the overlay instance; and locating the cached overlay instance by finding a respective one of the cached overlay instances that has the same rotation as the overlay instance.

5. The method according to claim 1, further comprising:

calculating a minimal logical size of the overlay by intersecting the another overlay instance and the cached overlay instance.

6. The method according to claim 1, further comprising:

tracking use of each of the cached overlay instances; and deleting one of the cached overlay instances from the memory system only when rasterizing processors are no longer referencing the one of the cached overlay instances.

7. The method according to claim 1, wherein tracking use of each of the cached overlay instances further comprises:
incrementing a usage reference count by one for one of the cached overlay instances if a rasterizing processor references the one of the cached overlay instances; and
decrementing the usage reference count by one for the one of the cached overlay instances after the rasterizing processors has finished referencing the one of the cached overlay instances.

8. A presentation system comprising:
a local memory; and
a rasterizing processor, coupled to the local memory, that responsive to receipt of a presentation requirements specifying an overlay stored in a memory device, determines whether an overlay instance for the overlay is cached in a memory system, responsive to the overlay instance not being cached in the memory system, generates a new overlay instance for the overlay and caches the new overlay instance in the memory system; and responsive to the overlay instance being cached in the memory system, produces another overlay instance tailored to the presentation requirements and compares the another overlay instance to the cached overlay instance and then caches into the memory system only one overlay instance among the another overlay instance and the cached overlay instance that best presents the overlay and discards the other overlay instance.

9. The presentation system according to claim 8, wherein:
the rasterizing processor finds all cached overlay instances of the overlay in the memory system; and
the rasterizing processor determines whether the cached overlay instance exists among the found cached overlay instances in the memory system.

10. The presentation system according to claim 9, wherein:
the rasterizing processor selects the cached overlay instance as the one instance if the rasterizing processor determines that the cached overlay instance has a smaller overlay area than the another overlay instance; and
the rasterizing processor selects the another overlay instance as the one instance if the rasterizing processor determines that the another overly instance has the smaller overlay area than the cached overlay instance.

11. The presentation system according to claim 9, wherein:
the rasterizing processor references all cached overlay instances for the overlay in the memory system;
the rasterizing processor determines a rotation of the overlay instance; and
the rasterizing processor locates the cached overlay instance by finding a respective one of the cached overlay instances that has the same rotation as the overlay instance.

12. The presentation system according to claim 8, wherein:
the rasterizing processor calculates a minimal logical size of the overlay by intersecting the another overlay instance and the cached overlay instance.

13. The presentation system according to claim 8, wherein:
the rasterizing processor tracks use of each of the cached overlay instances; and
the rasterizing processor deletes one of the cached overlay instances from the memory system only when all processors within the rasterizing processor are no longer referencing the one of the cached overlay instances.

14. The presentation system according to claim 8, wherein:
the rasterizing processor increments a usage reference count by one for one of the cached overlay instances if a processor within the rasterizing processor references the one of the cached overlay instances; and
the rasterizing processor decrements the usage reference count by one for the one of the cached overlay instances after the rasterizing processors has finished referencing the one of the cached overlay instances.

15. An article of manufacture for use in presentation devices, the article of manufacture comprising computer readable storage media including program logic embedded therein that causes control circuitry to perform the steps of:
in response to receiving a presentation requirements specifying an overlay stored in a memory device, determining whether an overlay instance for the overlay is cached in a memory system;
in response to the overlay instance not being cached in the memory system, generating a new overlay instance for the overlay and caching the new overlay instance in the memory system; and
in response to the overlay instance being cached in the memory system, producing another overlay instance tailored to the presentation requirements and comparing the another overlay instance to the cached overlay instance and then caching into the memory system only one overlay instance among the another overlay instance and the cached overlay instance that best presents the overlay and discarding the other overlay instance.

16. The article of manufacture according to claim 15, wherein the program logic further causes control circuitry to perform the steps of:
finding all cached overlay instances of the overlay in the memory system; and
determining whether the cached overlay instance exists among the found cached overlay instances in the memory system.

17. The article of manufacture according to claim 16, wherein the program logic further causes control circuitry to perform the steps of:
selecting the cached overlay instance as the one instance if the cached overlay instance has a smaller overlay area than the another overlay instance; and
selecting the another overlay instance as the one instance if the another overly instance has the smaller overlay area than the cached overlay instance.

18. The article of manufacture according to claim 16, wherein the program logic further causes control circuitry to perform the steps of:
referencing all cached overlay instances for the overlay in the memory system;
determining a rotation of the overlay instance; and
locating the cached overlay instance by finding a respective one of the cached overlay instances that has the same rotation as the overlay instance.

19. The article of manufacture according to claim 15, wherein the program logic further causes control circuitry to perform the step of:

calculating a minimal logical size of the overlay by intersecting the another overlay instance and the cached overlay instance.

20. The article of manufacture according to claim 15, wherein the program logic further causes control circuitry to perform the steps of:

tracking use of each of the cached overlay instances; and deleting one of the cached overlay instances from the memory system only when rasterizing processors are no longer referencing the one of the cached overlay instances.

21. The article of manufacture according to claim 15, wherein the program logic further causes control circuitry to perform the steps of:

incrementing a usage reference count by one for one of the cached overlay instances if a rasterizing processor references the one of the cached overlay instances; and decrementing the usage reference count by one for the one of the cached overlay instances after the rasterizing processors has finished referencing the one of the cached overlay instances.

* * * * *